(12) United States Patent
Dawe

(10) Patent No.: US 6,909,526 B1
(45) Date of Patent: Jun. 21, 2005

(54) GREETING CARD MAKER FOR USE WITH A SCANNER

(75) Inventor: Julie T. Dawe, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 706 days.

(21) Appl. No.: 09/668,564

(22) Filed: Sep. 22, 2000

(51) Int. Cl.[7] .............................. H04N 1/40; H04N 1/04
(52) U.S. Cl. ...................... 358/471; 358/474; 358/497; 358/488; 355/75; 355/40; 399/377
(58) Field of Search .................................. 358/471, 474, 358/497, 494, 487, 506, 505, 501, 401, 400, 500, 488; 382/312, 318, 319; 250/234–236; 399/377–380, 211; 355/75, 40; 271/3.14; 40/706

(56) References Cited

U.S. PATENT DOCUMENTS

| | | | | |
|---|---|---|---|---|
| 3,973,344 A | * | 8/1976 | Frankel | ........................ 40/706 |
| 4,078,786 A | * | 3/1978 | Stange | ........................ 271/3.14 |
| 5,285,237 A | * | 2/1994 | Parulski et al. | ................ 355/75 |
| 6,043,866 A | * | 3/2000 | Kawai et al. | |

* cited by examiner

Primary Examiner—Cheukfan Lee

(57) ABSTRACT

Greeting card making apparatus for assisting in the production of a greeting card by duplication apparatus may comprise a layout template that defines a layout area. The layout area accommodates at least one object that is to be contained in the greeting card. The greeting card making apparatus is convertible between a layout mode and a duplication mode. During the layout mode, the layout area is observable by a user so that the user may observe an arrangement of the at least one object within the layout area. During the duplication mode, the layout template is reproducible by the duplication apparatus so that the duplication apparatus produces a copy of the arrangement of the at least one object within the layout area defined by the layout template.

22 Claims, 5 Drawing Sheets

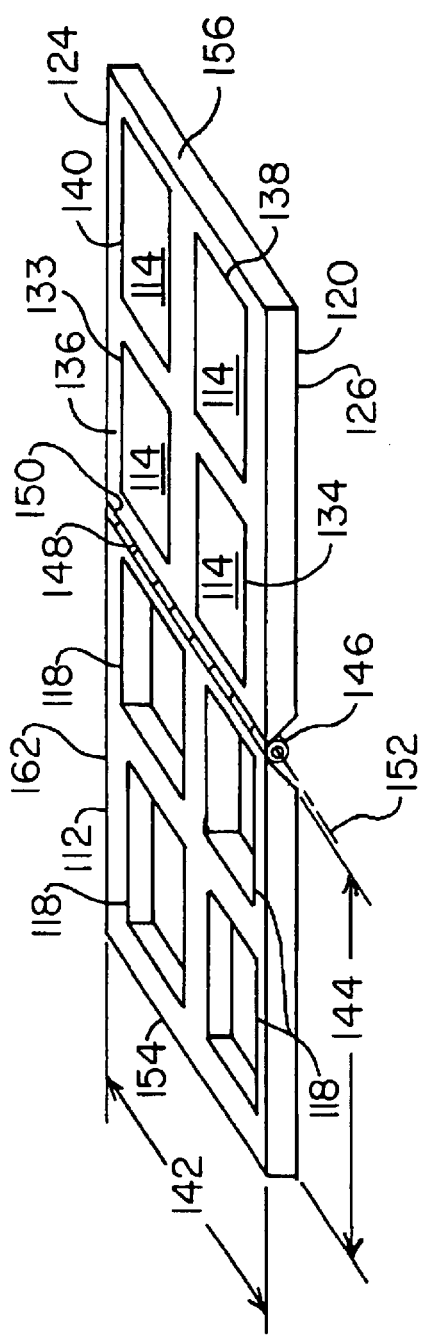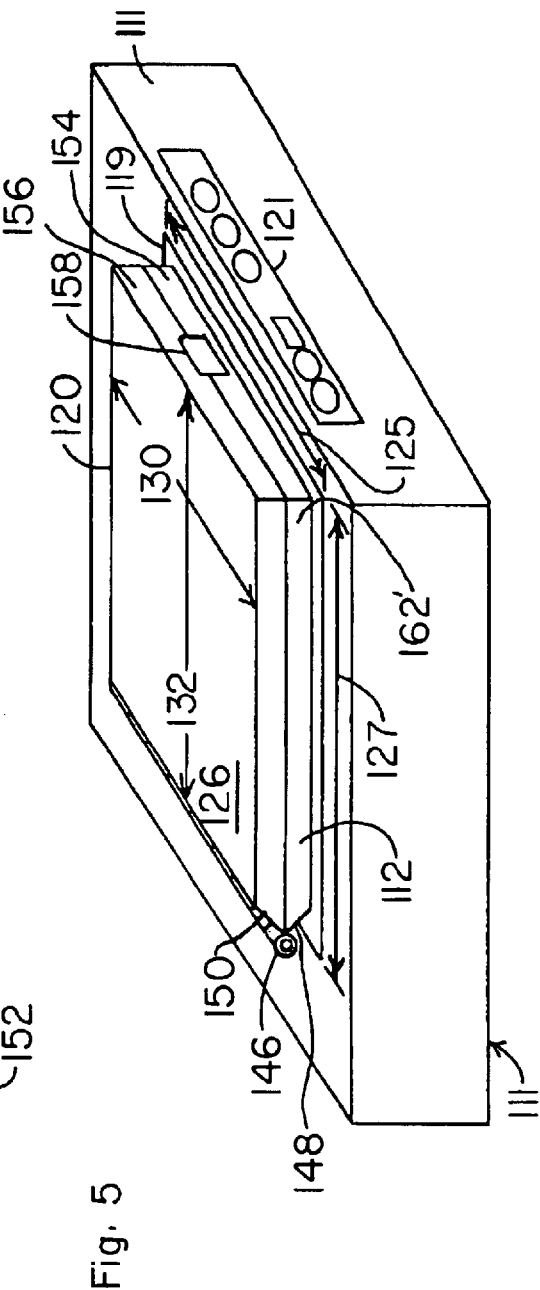

GREETING CARD MAKER FOR USE WITH A SCANNER

FIELD OF INVENTION

This invention relates to desk-top publication devices in general and more specifically to a method and apparatus for using an optical scanner device to produce greeting cards.

BACKGROUND

Scanner devices, such as flatbed scanners, are well-known in the art and produce machine-readable image data signals that are representative of a scanned object, such as a photograph or a page of printed text. In a typical scanner application, the image data signals produced by a flat bed scanner 11 (FIG. 1) may be used by a personal computer (not shown) to reproduce an image of the scanned object on a suitable display device (not shown), such as CRT or a printer.

A typical flatbed scanner 11 comprise a scanner housing 13 suitable for holding the various systems and components of the flatbed scanner 11. In a common configuration, the scanner housing 13 may comprise a generally rectangularly shaped structure having a top side 15 and a bottom side 17 that are positioned in a generally parallel, spaced-apart relation to one another. The top side 15 of scanner housing 13 may include a generally rectangularly shaped scanning bed or transparent platen 19 provided thereon having a length 25 and a width 27. The scanning bed 19 allows an object positioned adjacent the scanning bed 19 to be scanned by a scanning device (not shown) contained within the housing 13.

The scanner housing 13 may be further provided with a control panel 21 operatively associated with the flatbed scanner 11. A scanner lid 23 may be pivotally attached to the housing 13 via a hinge member 29. The hinge member 29 allows the scanner lid 23 to rotate about a pivot axis 31 between an opened position and a closed position.

The flatbed scanner 11 may further include illumination and optical systems (not shown) positioned within the housing 13 underneath the scanning bed 19. The illumination and optical systems accomplish the scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector (not shown) positioned within the scanner housing 13. Image data representative of the entire object then may be obtained by sweeping the scan line across the entire object, usually by moving the illumination and optical systems with respect to the object.

By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" (CIS) may be used to collect and focus light from the illuminated scan region on the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

Flatbed scanners and the various components thereof are disclosed in U.S. Pat. No. 6,040,572 for NOTEBOOK STYLED SCANNER of Khovaylo, et al.; U.S. Pat. No. 4,926,041 for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; U.S. Pat. No. 4,870,268 for COLOR COMBINER AND SEPARATOR AND IMPLEMENTATIONS of Kent J. Vincent and Hans D. Neuman; U.S. Pat. No. 5,038,028 for OPTICAL SCANNER APERTURE AND LIGHT SOURCE ASSEMBLY of Boyd, et al.; and U.S. Pat. No. 5,227,620 for APPARATUS FOR ASSEMBLING COMPONENTS OF COLOR OPTICAL SCANNERS of Elder, et al., which are each hereby specifically incorporated by reference for all that is disclosed therein.

As personal computers and their peripheral devices continue to decrease in price while increasing in quality, more users find themselves with home computer systems that include scanners and high-quality color printers. Although many of the users have been informed of the ease with which creative tasks can be performed with such high-tech devices, many creative tasks are far too complex for the average user to successfully complete and enjoy. For example, if a user desires to create a customized greeting card with a computer, printer, and flatbed scanner arrangement, the user must first decide what images and/or text are to be contained in the greeting card. If the user opts to individually scan each object that is to be contained in the greeting card, the user must first scan each object with the scanner in order to create an electronic image of the object. The electronic images must then be positioned into the desired arrangement before the greeting card can be reproduced by the printer. Such a procedure typically requires extensive computer-based editing since the individual images resulting from the successive scans generally need to be sized, shaped, cut, and appropriately positioned before the desired arrangement is obtained. For many users, such editing of the electronic images quickly turns a creative endeavor into a tedious task.

One way for users to reduce the amount of image editing is to pre-arrange the objects that are to be contained in the greeting card prior to scanning. However, this procedure can be difficult in that the objects must be positioned upside-down on the scanning bed 19 in the desired arrangement. For instance, if the user places the objects face-down in a certain arrangement on the scanning bed 19, the user must peel back an edge of each object to check the alignment of that object with respect to the scanning bed 19. Unfortunately, because it is difficult to confirm correct alignment while looking at the objects upside-down, the first scan of the arrangement is often unsatisfactory. Thus, the user is forced to reposition the objects and perform another scan. Although this process may eventually yield good results, it usually does so only after several repeated attempts by the user. In the meantime, the user may have wasted considerable time and processing capacity (associated with scanning the objects and displaying the scanned image) before the desired arrangement has been scanned. As a result, this "scan, evaluate, reposition, re-scan, re-evaluate" process often results in the user being completely frustrated and disappointed. Moreover, even if the user is able to successfully position the objects on the scanning bed 19 in the desired arrangement prior to scanning, the closing of the scanner lid 23 may cause the objects to shift from that desired arrangement, again resulting in an unsatisfactory scan.

Partly in an effort to alleviate the aforementioned problems, software programs have been developed that allow users to create customized greeting cards from the images of the scanned objects. While such software programs work and are currently being used, they often remain too complex and intimidating for the average user.

All of the aforementioned problems could certainly be avoided by the user simply purchasing a greeting card from a retail store. Most retail stores, however, do not provide for the purchase of customized greeting cards. For those retail stores that do (i.e., with greeting card making kiosks), the purchaser's level of creativity when customizing the greeting card is significantly curtailed. Moreover, the retail prices for greeting cards, whether customized or not, can be rather high. In addition, a significant amount of time is required to purchase a greeting card since time must be set aside for traveling to and from the retail store, for creating or selecting the greeting card, for waiting in the check-out line, and for purchasing the card. Finally, the spontaneity that is otherwise afforded when a greeting card is created with a computer, printer, and scanner is simply not afforded when that greeting card must instead be purchased.

Consequently, a need remains for greeting card making apparatus that improves user efficiency, success rate and satisfaction. Ideally, the greeting card making apparatus would be easy to use with currently available flatbed scanner, computer, and printer devices. The greeting card making apparatus should inform the user on the proper position and orientation for the selected objects and also allow the user to observe the arrangement of the objects prior to scanning in order to avoid the need to repeatedly scan, evaluate, and reposition the objects so that they conform to the desired layout. Finally, such a greeting card making apparatus should minimize the amount of time required for computer-based editing of the scanned images.

SUMMARY OF THE INVENTION

Greeting card making apparatus for assisting in the production of a greeting card by duplication apparatus may comprise a layout template that defines a layout area. The layout area accommodates at least one object that is to be contained in the greeting card. The greeting card making apparatus is convertible between a layout mode and a duplication mode. During the layout mode, the layout area is observable by a user so that the user may observe an arrangement of the at least one object within the layout area. During the duplication mode, the layout template is reproducible by the duplication apparatus so that the duplication apparatus produces a copy of the arrangement of the at least one object within the layout area defined by the layout template.

Also disclosed is a method for making a greeting card that comprises the steps of: providing a greeting card making apparatus that defines a layout area; positioning at least one object within the layout area defined by the greeting card making apparatus; observing an arrangement of the at least one object within the layout area; positioning the greeting card making apparatus so that the layout area is adjacent a duplicating bed of a duplication apparatus; and operating the duplication apparatus to duplicate the arrangement of the at least one object within the layout area and to produce a copy of the arrangement of the at least one object within the layout area.

BRIEF DESCRIPTION OF THE DRAWING

Illustrative and presently preferred embodiments of the invention are shown in the accompanying drawing in which:

FIG. 5 is a perspective view of a second embodiment of the greeting card making apparatus; and FIG. 6 is a perspective view of the second embodiment of the greeting card making apparatus shown in position on a flatbed scanner.

DETAILED DESCRIPTION OF THE INVENTION

Figure 1:
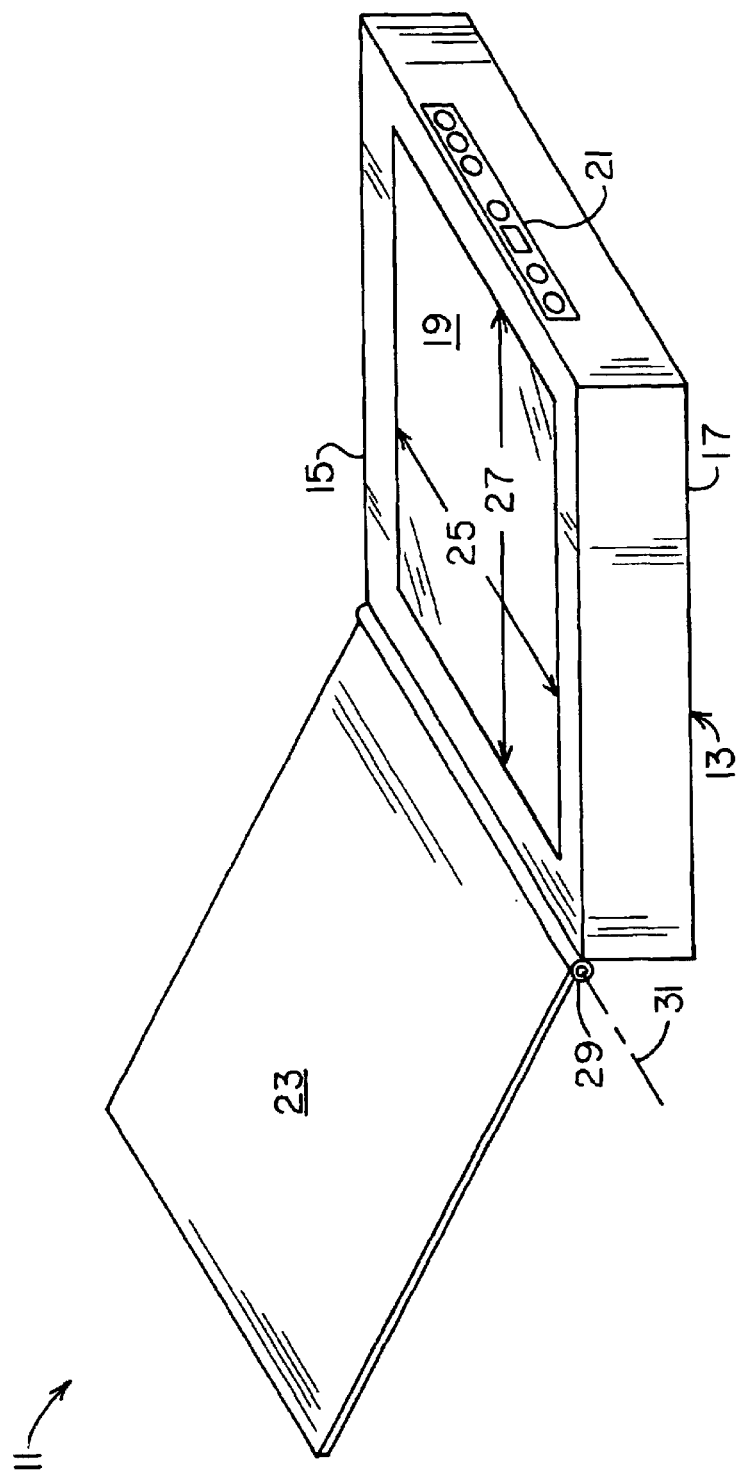
FIG. 1 is a perspective view of a prior art flatbed scanner.
Figure 2:
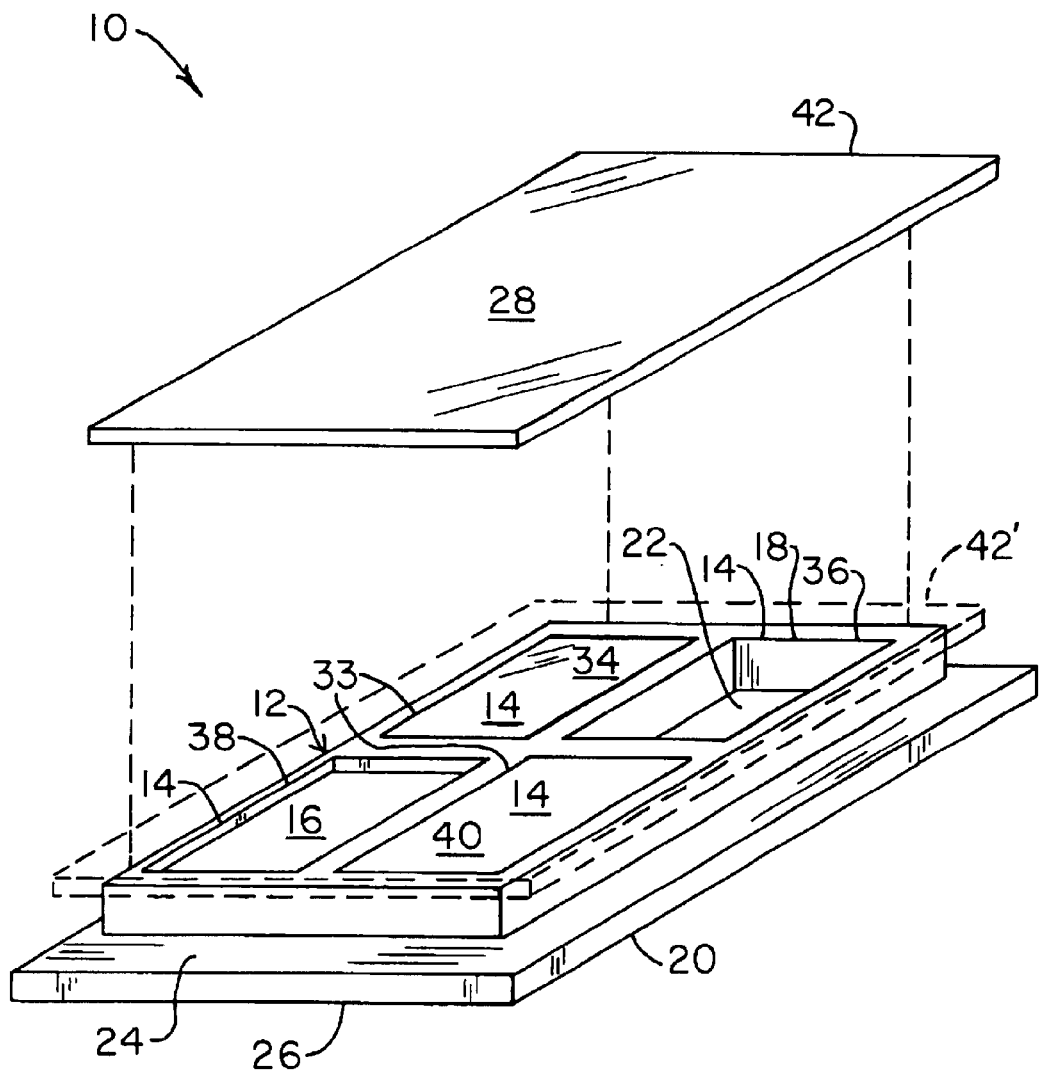
FIG. 2 is a perspective view of the greeting card making apparatus according to one embodiment of the present invention that may be used with the flatbed scanner illustrated in FIG. 1.
Figure 3:
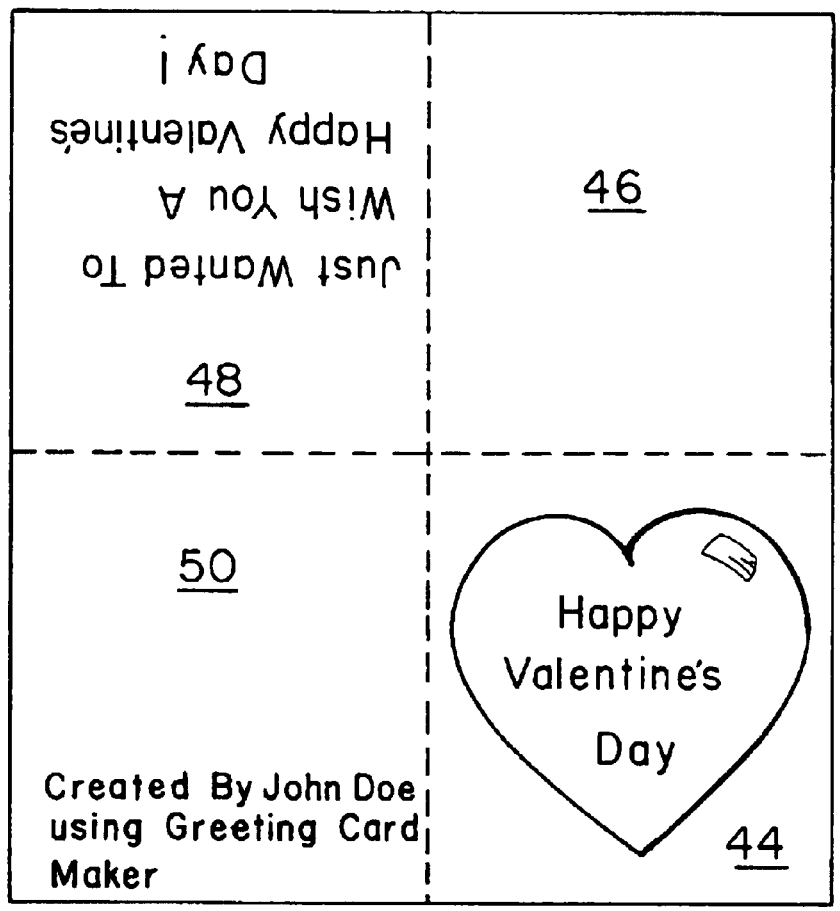
FIG. 3 is a plan view of an unfolded greeting card showing the arrangement and orientations of the various layout areas before the card is folded to form an openable greeting card.

Greeting card making apparatus 10 according to one preferred embodiment of the present invention is shown in FIG. 2 and described herein as it could be used in conjunction with a flatbed scanner 11 (FIG. 1) to create an unfolded greeting card 35 (FIG. 3). The unfolded greeting card 35 may be folded by the user (not shown) to produce an openable greeting card of the type that is well-known in the art. Alternatively, and as will be explained in greater detail below, the greeting card making apparatus 10 may be used in conjunction with any of a wide range of other duplication devices, such as photocopiers, cameras, or other types of duplication systems. The greeting card making apparatus 10 may also be used to produce documents and things besides greeting cards.

With reference now primarily to FIG. 2, the greeting card making apparatus 10 may comprise a layout template 12 that defines one or more layout areas 14. Each of the various layout areas 14 may accommodate at least one object (not shown), such as a photograph, drawing, written text, etc. (not shown), that is to be contained in the greeting card. Of course, and as will be described in greater detail below, there is no need to position an object in every layout area 14 that is provided on the layout template 12. The greeting card making apparatus 10 is convertible between a layout mode or configuration (illustrated in FIG. 2) and a scan mode or configuration (not specifically illustrated in the drawing Figures, but described below). When greeting card making apparatus 10 is placed in the layout mode or configuration, the user is able to position objects within some or all of the layout areas 14 and then observe their arrangement prior to scanning. During the scan mode or configuration, the greeting card making apparatus 10 is positioned on the scanning bed 19 of the scanner 11 so that the layout areas 14 are scannable thereby. Thereafter, the flatbed scanner 11 may be operated to scan the layout areas 14 and capture an electronic image of the arrangement of the objects contained within the layout areas 14.

The layout areas 14 may be used to define a proper position and orientation therein for the objects that are to be placed within those layout areas 14. As such, the layout areas 14 may comprise any of a wide range of structural configurations and identifying indicia suitable for allowing the user to position each object in a desired position and orientation.

For example, in the embodiment shown and described herein, some or all of the layout areas 14 may comprise structures and indicia that include, but are not limited to, a recessed area 16, an opening 18, and guide lines 33. Alternatively, the layout areas 14 may comprise other structures and indicia, such as raised areas, dashed lines, dotted lines, polka-dots, shaded areas, or written text.

The layout areas 14 may be defined by the layout template 12 so that the particular layout area 14 into which an object is placed determines the specific greeting card section in which the image of the object will be contained. For example, with reference to FIG. 3, the unfolded greeting card 35 may comprise a front outer portion or section 44, a front inner portion or section 46, a back inner portion or section 48, and a back outer portion or section 50. In this example, the layout template 12 will contain a layout area 14 that corresponds to each of the greeting card sections 44, 46, 48, and 50. Accordingly, the layout areas 14 may be provided with suitable indicia (not shown) to inform the user of the correspondence between the layout area 14 and the particular section (i.e., 44, 46, 48, and 50) contained on the unfolded greeting card 35. In other words, the user can choose the specific greeting card section for an object by placing that object into the layout area 14 that corresponds to the desired greeting card section.

In the embodiment shown in FIG. 2, the greeting card making apparatus 10 may comprise an optional backing member 20 having a front side 24 and a back side 26. Depending on the particular structures or indicia comprising the layout areas 14, the backing member 20 may form a portion of one or more of the layout areas 14. For example, if the layout area 14 comprises an opening 18 a portion 22 of the front side 24 of the backing member 20 will comprise the back or bottom of the opening 18.

The greeting card making apparatus 10 may be provided with an optional transparent cover member 28 that is movable between a first position 42 and a second position 42' (shown in broken lines in FIG. 2). When in the first position 42, the transparent cover member 28 exposes the layout areas 14, thereby allowing the user to position one or more objects thereon. When in the second position 42', the transparent cover member 28 covers the layout areas 14, thereby helping to secure the objects positioned within the layout areas 14. Of course, the backing member 20 may also assist in securing any objects that may be contained in layout areas 14 which comprise openings 18 in the template 12.

The greeting card making apparatus 10 may be used as follows to create a greeting card with the flatbed scanner 11. Assuming that the user has selected the objects (not shown) that are to be contained in the greeting card, the user moves the transparent cover member 28 to its first position 42 (or removes the transparent cover member 28, as shown in FIG. 2) and places the objects within the desired layout areas 14. As mentioned above, it is not necessary for the user to place an object in each layout area 14. For example, in the unfolded greeting card 35 illustrated in FIG. 3, no object is contained in the front inner portion 46 of card 35. In any event, once the user has positioned the object or objects in the desired layout areas 14, the user may then place the transparent cover member 28 over the layout template 12. This is referred to herein as the "second position 42'" of the cover member 28. When in the second position 42', the transparent cover member 28 encloses the objects within the layout areas 14 which also helps to secure the objects therein. The user may then observe the arrangement of the objects within the layout areas 14 through the transparent cover member 28 to ensure a proper arrangement. If satisfied, the user positions the greeting card making apparatus 10 on the scanner 11 so that the transparent cover member 28 is face-down on the scanning bed 19. The user next actuates the flatbed scanner 11 to scan the arrangement of the objects within the various layout areas 14 on the template 12. Thereafter, the image data (not shown) produced by the flatbed scanner 11 may be transferred to a host computer (not shown) which causes a printer (also not shown) to reproduce a copy of the arrangement of the objects within the layout areas 14 in the form of the unfolded greeting card 35 shown in FIG. 3. Thereafter, the unfolded greeting card 35 may be folded to created a folded greeting card (not shown).

A significant advantage of the greeting card maker according to the present invention is that the layout areas 14 of the greeting card making apparatus 10 assist the user in placing the objects in the appropriate positions and orientations on the template 12. By doing so, the resulting scanned image will need little or no subsequent computer-based editing. Indeed, if the objects are properly positioned within the layout areas 14, no software interaction will be necessary other than that which is normally necessary for scanning and printing. Thus, the time needed to create a greeting card with the flatbed scanner 11 is minimized.

Another significant advantage of the present invention is that it improves greeting card making without requiring any hardware changes to the scanner, the host computer, or the printer. Yet another significant advantage of the present invention is that it allows a user to observe an arrangement of the objects within the various layout areas 14 prior to scanning the objects. Since the user is able to observe the arrangement prior to scanning, the need to repeatedly scan, evaluate and reposition the objects is eliminated. In addition, the user's frustration associated with the repeated scanning, evaluating and repositioning process is eliminated.

Still yet another advantage of the present invention is that the greeting card making apparatus 10 secures the objects within the layout areas 14. Therefore, the closing of the scanner lid 23 will not disturb the arrangement of the objects within the various layout areas 14.

Having briefly described the greeting card making apparatus 10 according to one embodiment of the present invention, as well as some of its more significant features and advantages, the various preferred embodiments of the greeting card making apparatus will now be described in detail. However, before proceeding with the description, it should be noted that while the alternative embodiments 10, 110 of the greeting card making apparatus are shown and described herein as they could be used in conjunction with flatbed scanners 11, 111 to create a greeting card, they could also be used in any of wide range of other applications and be used in conjunction with any of a wide range of other duplication apparatus, such as photocopier apparatus, cameras, and the like. Indeed, the greeting card making apparatus 10, 110 could be used in conjunction with any of a wide range of duplication devices that are now known in the art or that may be developed in the future. Consequently, the present invention should not be regarded as limited to use with the components and in the situations shown and described herein.

With the foregoing considerations in mind, one preferred embodiment of the greeting card making apparatus 10 according to the present invention is shown in FIG. 2 and described herein as it could be used in conjunction with a flatbed scanner 11 (FIG. 1) of the type that is well-known in the art and readily commercially available. The greeting card making apparatus 10 may comprise a layout template 12 that defines one or more layout areas 14. Each layout area 14 may accommodate at least one object, such as a photograph, drawing, written text, etc. (not shown), that is to be contained in the greeting card. However, it is not necessary to position an object in each layout area 14. Indeed, there are many applications wherein one or more of the layout areas 14 are not selected to be utilized by the user. Consequently, the present invention should not be regarded as limited to situations wherein the user positions at least one object in each of the layout areas 14.

As briefly described above, the greeting card may be utilized in a layout mode or configuration and a scan mode or configuration. During the layout mode or configuration (illustrated in FIG. 2), the user positions the object or objects within the various layout areas 14 and observes their arrangement to ensure that they are arranged in the desired configuration. Since the user is able to observe the arrangement prior to scanning, the need to repeatedly scan, evaluate and reposition the objects to scan the desired arrangement is eliminated. During the scan mode or configuration, the greeting card making apparatus 10 is positioned on the scanning bed 19 of scanner 11 so that the layout areas 14 are scannable by the flatbed scanner 11. The scanner may then be operated to scan the layout areas 14 and capture an electronic image of the arrangement of the objects within the various layout areas 14.

Figure 4:
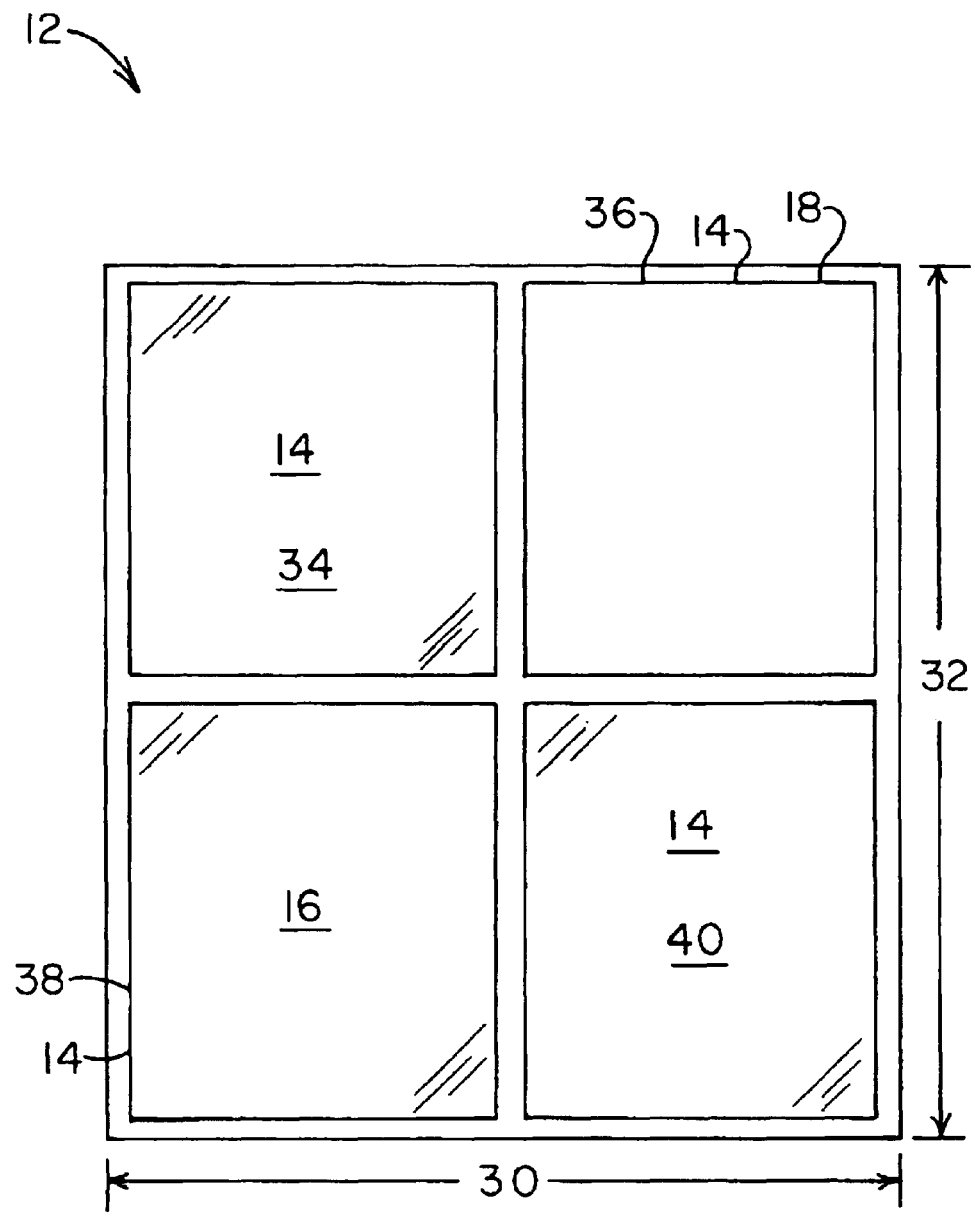
FIG. 4 is a plan view of the layout template of the greeting card making apparatus shown in FIG. 2.

With reference now primarily to FIGS. 2 and 4, the layout template 12 of the greeting card making apparatus 10 may comprise any of a wide variety of suitable shapes, sizes and configurations. For example, in the embodiment shown and described herein, the layout template 12 comprises a generally rectangular shape having a length 30 and width 32 (FIG. 4) that are about equal to the length 25 and width 27, respectively, of the scanning bed 19 (FIG. 1). Alternatively, other shapes and configurations are possible, as would be obvious to persons having ordinary skill in the art after having become familiar with the teachings of the present invention. The layout template 12 may be fabricated from any of a wide range of materials (e.g., paper, cardboard, plastics, metals, or glass) that would be suitable for the intended application. In one preferred embodiment, the layout template 12 is fabricated from cardboard.

As was briefly mentioned above, the layout template 12 defines at least one layout area 14, although in most applications the layout template 12 may define a plurality of layout areas 14. Consequently, the present invention should not be regarded as limited to a layout template 12 defining any specific number of layout areas 14. However, by way of example, in the embodiment shown and described herein, the layout template 12 defines four separate layout areas 14 (e.g., 34, 36, 38, and 40).

The layout area or areas 14 defined by the layout template 12 may also take on any of a wide variety of shapes and sizes depending on the particular application for which the layout template 12 is to be used. Accordingly, the present invention should not be regarded as limited to a template 12 that defines layout areas 14 having any particular size or shaped. By way of example, each of the layout areas 14 defined by the template 12 in one embodiment of the invention may comprise a generally rectangular configuration.

As mentioned above, the layout areas 14 may each define a proper position and orientation for the objects that are to be placed in those layout areas 14. Accordingly, the layout areas 14 may comprise any of a wide range of structural configurations and identifying indicia suitable for allowing the user to position each object in a desired position and orientation. For example, in the embodiment shown and described herein, some or all of the layout areas 14 may comprise structures and indicia that include, but are not limited to, a recessed area 16, an opening 18, and guide lines 33. Alternatively, the layout areas 14 may comprise other structures and indicia, such as raised areas, dashed lines, dotted lines, polka-dots, shaded areas, or written text.

The layout areas 14 may be defined by the layout template 12 so that the particular layout area 14 into which an object is placed determines the specific greeting card section in which the image of the object will be contained. For example, with reference now to FIG. 3, the unfolded greeting card 35 may comprise a front outer portion or section 44, a front inner portion or section 46, a back inner portion or section 48, and a back outer portion or section 50. Accordingly, in this example, the layout template 12 defines a layout area 14 that corresponds to each of the greeting card sections 44, 46, 48, and 50. The layout areas 14 may be provided with suitable indicia (not shown) to inform the user of the correspondence between the layout area 14 and the particular section (i.e., 44, 46, 48, and 50) contained on the unfolded greeting card 35. Therefore, the user can choose the specific greeting card section for an object by placing that object into the layout area 14 that corresponds to the desired greeting card section.

With reference now to FIGS. 3 and 4, the layout areas 14 may be defined by the layout template 12 such that the particular layout area 14 into which an object is placed determines the specific greeting card section, such as the front outer portion 44, front inner portion 46, back inner portion 48, or back outer portion 50 (FIG. 3), in which the object will be contained. In other words, the user can choose the specific greeting card section for an object by placing that object into the layout area 14 that corresponds to the desired greeting card section. For example, in the embodiment shown and described herein, the first (i.e., 34) layout area 14 (FIG. 4) is defined so that a duplicate of an object (i.e., inside greeting) positioned upside-down in the first layout area 34 will be contained right-side-up in the back inner portion 48 (FIG. 3) of the greeting card. A second (i.e., 36) layout area 14 (FIG. 4) is defined so that a duplicate of an object positioned upside-down in the second layout area 36 will be contained right-side-up in the front inner portion 46 (FIG. 3) of the greeting card. A third (i.e., 38) layout area 14 (FIG. 4) is defined so that a duplicate of an object (i.e., credit) positioned right-side-up in the third layout area 38 will be contained right-side-up in the back outer portion 50 (FIG. 3) of the greeting card 35. A fourth (i.e., 40) layout area 14 (FIG. 4) is defined so that a duplicate of an object (i.e., front cover art) positioned right-side-up in the fourth layout area 40 will be contained right-side-up in the front outer portion 44 (FIG. 3) of the greeting card 35.

The layout areas 14 may be provided with fasteners (not shown) to secure the objects within the layout areas 14. Any such fasteners may be selected from any of a wide range of fastening devices or systems (e.g., clips or adhesives) that would be suitable for the intended application. By way of example, double-sided adhesive tape may be used to mount an object within a respective layout area 14. In another embodiment, a tacky surface may be provided within a layout area 14 so that an object may be mounted within that layout area 14. In yet another embodiment, a layout area 14 may be provided with corner mounting inserts sized to receive the corners of an object so that an object may be mounted within that layout area 14. In still yet another embodiment, glue may be used to mount an object within a layout areas 14. In still another arrangement, hook and loop fasteners (e.g., Velcro®) may be used to mount an object within a layout area 14.

In the embodiment shown in FIG. 2, the greeting card making apparatus 10 may comprise an optional backing member 20 having a front side 24 and a back side 26. Depending on the particular structures or indicia comprising the layout areas 14, the backing member 20 may form a portion of one or more of the layout areas 14. For example, if the layout area 14 comprises an opening 18 a portion 22 of the front side 24 of the backing member 20 will comprise the back or bottom of the opening 18.

It is generally preferred, but not required, that the backing member 20 be attached to the layout template 12. Any of a wide range of fastening devices or systems (e.g., by mechanical fasteners or adhesives) may be used to attach the backing member 20 to the layout template 12. By way of example only, an adhesive tape or glue (not shown) may be used to attach the backing member 20 to the layout template 12 so that a space or insert slot (not shown) is defined between the backing member 20 and the layout template 12. The insert slot would allow objects to be inserted between the backing member 20 and the layout template 12. In another embodiment, the backing member 20 may be pivotally attached to the layout template 12 via a hinge member (not shown). The hinge member would allow the backing member 20 to be pivoted with respect to the layout template 12. It is generally preferred, but not required, that if a hinge member is used that hinge member be fully articulating so that the user could lay both the backing member 20 and the layout template 12 flat against a surface during the layout mode.

It is also generally preferred, but not required, that an edge of backing member 20 be releasably engagable with an edge of layout template 12 during the scan mode of the greeting card making apparatus 10 (not shown). Such an arrangement would prevent the backing member 20 from separating from the layout template 12, particularly where the backing member 20 is hinged to the layout template 12. A fastener (not shown) selected from any of a wide range of fastening systems or devices (e.g., screws, rivets, adhesives, formed tabs and hooks, brackets, etc.), suitable for the intended application, could be used to releasably secure an edge of backing member 20 to an edge of layout template 12.

The backing member 20 may be made from any of a wide range of materials (e.g., paper, cardboard, plastics, metals, or glass) that would be suitable for the intended application. In one preferred embodiment, the backing member 20 is fabricated from plastic. Alternatively, other materials could be used, as would be obvious to persons having ordinary skill in the art after having become familiar with the teachings of the present invention.

The greeting card making apparatus 10 may be provided with an optional transparent cover member 28 that is movable between a first position 42 and a second position 42' (shown in broken lines in FIG. 2). When in the first position 42, the transparent cover member 28 exposes the layout areas 14, thereby allowing the user to position one or more objects thereon. When in the second position 42', the transparent cover member 28 covers the layout areas 14, thereby helping to secure the objects positioned within the layout areas 14. Of course, the backing member 20 may also assist in securing any objects that may be contained in layout areas 14 which comprise openings 18 in the template 12.

It is generally preferred, but not required, that the transparent cover member 28 be attached to the layout template 12 (not shown). Any of a wide range of fastening devices or systems (e.g., by mechanical fasteners or adhesives) may be used to attach the transparent cover member 28 to the layout template 12. By way of example only, an adhesive tape (not shown) may be used to attach the transparent cover member 28 to the layout template 12. Alternatively, the transparent cover member 28 may be pivotally attached to the layout template 12 via a hinge member (not shown). The hinge member would allow the transparent cover member 28 to be pivoted with respect to the layout template 12 so that the transparent cover member 28 may be pivoted between the first and second positions 42, 42'. It is generally preferred, but not required, that if a hinge member is used that that hinge member be fully articulating so that the user could lay both the layout template 12 and the transparent cover member 28 flat against a surface during the layout mode. Alternatively, and depending on the application, the transparent cover member 28 may instead be attached to the backing member 20 or be attached to both the backing member 20 and the layout template 12.

It is also generally preferred, but not required, that an edge of transparent cover member 28 be releasably engagable an edge of layout template 12 when the transparent cover member 28 is in its second position 42' (not shown) to prevent the transparent cover member 28 from separating from the template 12. A fastener (not shown) selected from any of a wide range of fastening systems or devices (e.g., screws, rivets, adhesives, formed tabs and hooks, brackets, etc.), suitable for the intended application, may be used to releasably secure an edge of transparent cover member 28 to an edge of layout template 12. Alternatively, and depending on the application, an edge of transparent cover member 28 may instead engage an edge of backing member 20 or engage both an edge of backing member 20 and an edge of layout template 12 when the transparent cover member 28 is in its second position 42'.

The transparent cover member 28 may comprise any of a wide range of transparent materials (e.g., plastics or glasses) suitable for the intended application. In the embodiment shown and described herein, the transparent cover member 28 comprises a transparent plastic material, although other materials could also be used.

The greeting card making apparatus 10 may be used as follows to create a greeting card with a flatbed scanner 11. Assuming that the user has selected the objects to be contained in the greeting card, the user moves the transparent cover member 28 to its first position 42 (i.e., removes the transparent cover member 28 from the template 12) and places each of the objects within the appropriate layout area 14. The user then moves the transparent cover member 28 to its second position 42' thereby enclosing and securing the objects within the layout areas 14. The user may then observe the arrangement of the objects within the layout areas 14 through the transparent cover member 28 to ensure a proper arrangement. If satisfied, the user positions the greeting card making apparatus 10 so that the transparent cover member 28 is face-down on the scanning bed 19 of scanner 11. The user next actuates the flatbed scanner 11 so that the flatbed scanner 11 scans the arrangement of the objects within the layout areas 14 through the transparent cover member 28. The flatbed scanner 11 then sends image data signals that are representative of the arrangement of the objects within the layout areas 14 to a host computer (not shown). Thereafter, the host computer may cause a printer (not shown) to reproduce a copy of the arrangement of the objects within the layout areas 14 in the form of the unfolded greeting card 35. The unfolded greeting card 35 may then be folded as necessary to create the final greeting card product.

A second embodiment 110 of the greeting card making apparatus is shown in FIGS. 5 and 6. This second embodiment 110 is similar to the first embodiment 10 described above except that a backing member 120 may be used to define one or more layout areas 114. The backing member 120 may have a front side 124 and a back side 126. In the embodiment shown and described herein, the layout areas 114 defined by the backing member 120 are located on the front side 124 of backing member 120 (FIG. 5), although this is not required. Alternatively, the layout areas 114 may be located on the back side 126 of backing member 120 (not shown). The backing member 120 may have a length 130 and a width 132 that are approximately equal to the length 125 and width 127 of scanning bed 119.

The backing member 120 may be made from any of a wide range of materials (e.g., paper, cardboard, plastics, metals, or glass) that would be suitable for the intended application. In the embodiment shown and described herein, the backing member 120 is fabricated from transparent plastic.

Each of the layout areas 114 defined by the backing member 120 may accommodate at least one object that is to be contained in the greeting card. The layout areas 114 may be used to define a proper position and orientation therein for the objects that are to be placed in those layout areas 114. As such, the layout areas 114 may comprise any of a wide range of structural configurations and identifying indicia suitable for allowing the user to position each object in a desired position and orientation. For example, in the embodiment shown and described herein, the layout areas 114 comprise solid lines 133 that guide the user while placing the objects within the layout areas 114 so that the objects are placed properly (FIG. 5). Alternatively, the layout areas 114 may comprise other structures and indicia such as raised areas, recessed areas, openings, dashes, dotted lines, shaded areas, or written text.

In the embodiment shown and described herein, the backing member 120 defines four separate layout areas 114 (e.g. 134, 136, 138, 140). However, a greater or lesser number of layout areas 114 may be used depending on the particular application. Consequently, the present invention should not be regarded as limited to the particular number of layout areas 114 shown and described herein.

Each of the layout areas 114 may comprise a generally rectangularly shaped area that is essentially identical to the other layout areas 114, although such is not required. Alternatively, and as shown in FIG. 5, each of the layout areas 114 may have a shape and size that is different from the other layout areas 114.

As with the first embodiment 10, the layout areas 114 of the second embodiment 110 may be defined by the backing member 120 such that the particular layout area 114 into which an object is placed determines the specific greeting card section (i.e, front outer portion 44, front inner portion 46, back inner portion 48, back outer portion 50) in which the object will be contained. See FIG. 3. In other words, the user can choose the specific greeting card section for an object by placing that object into the layout area 114 that corresponds to the desired greeting card section. In the embodiment shown and described herein, a first layout area 134 (FIG. 5) is defined so that a duplicate of an object (i.e., inside greeting) positioned upside-down in the first layout area 134 will be contained right-side-up in the back inner portion 48 (FIG. 3) of the greeting card. A second layout area 136 (FIG. 5) is defined such that a duplicate of an object positioned upside-down in the second layout area 136 will be contained right-side-up in the front inner portion 46 (FIG. 3) of the greeting card. A third layout area 138 (FIG. 5) is defined such that a duplicate of an object (i.e., credit) positioned right-side-up in the third layout area 138 will be contained right-side-up in the back outer portion 50 (FIG. 3) of the greeting card. A fourth layout area 140 (FIG. 5) is defined such that a duplicate of an object (i.e., front cover art) positioned right-side-up in the fourth layout area 140 will be contained right-side-up in the front outer portion 44 (FIG. 3) of the greeting card. Other configurations are possible however.

The layout areas 114 may also include fasteners (not shown) for mounting the objects within the layout areas 114. Any such fasteners may be selected from any of a wide range of fastening devices or systems (e.g., clips or adhesives) that would be suitable for the intended application. By way of example, a double-sided adhesive tape may be used to mount an object within a respective layout area 114. In another embodiment, a tacky surface may be provided within a layout area 114 so that an object may be mounted within that layout area 114. In yet another embodiment, a layout area 114 may be provided with corner mounting inserts sized to receive the corners of an object so that an object may be mounted within that layout area 114. In still yet another embodiment, glue may be used to mount an object within a layout areas 114. In still another arrangement, hook and loop fasteners (e.g., Velcro®) may be used to mount an object within a layout area 114. In the embodiment shown and described herein, an aperture grille 112 secures any objects contained within the layout areas 114 when the aperture grille 112 is in its second position 162' (FIG. 6).

The greeting card apparatus 110 may further include an aperture grille 112 that is operatively associated with the backing member 120 so that the aperture grille 112 is movable between a first position 162 (FIG. 5) and a second position 162' (FIG. 6). The aperture grille 112 may include one or more openings 118 therein. In the first position 162, the aperture grille 112 exposes the layout areas 114. In the second position 162', the aperture grille 112 may cover a portion of the layout areas 114 with each opening 118 exposing a portion of the object that is contained in the layout area 114 positioned directly underneath that respective opening 118. The aperture grille 112 may also secure any objects contained within the layout areas 114 when the aperture grille 112 is in its second position 162'.

It is generally preferred, but not required, that the number of openings 118 equal the number of layout areas 114 defined by the backing member 120. It is also preferable to have each opening 118 be positioned directly above a respective layout area 114 when the aperture grille 112 is in its second position 162' so that each of the openings 118 exposes a portion of the object that is contained within the layout area 114 directly beneath it. It is also preferable to have the openings 118 sized such that their respective lengths and widths are about equal to the respective lengths and widths of the layout areas 114 beneath them. In the embodiment shown and described herein, the aperture grille 112 defines four separate openings 118, each of which has a substantially rectangular configuration.

It is generally preferred, but not required, that the aperture grille 112 be attached to the backing member 120 by any of a wide range of fastening devices or systems (e.g., by mechanical fasteners or adhesives). In the embodiment shown and described herein, the aperture grille 112 is pivotally attached to the backing member 120 via a hinge member 146 (FIGS. 5 and 6). More specifically, the hinge member 146 is attached to a first edge 148 of aperture grille 112 and to a first edge 150 of backing member 120. The hinge member 146 allows the aperture grille 112 to be pivoted with respect to the backing member 120. Stated differently, the aperture grille 112 may be pivoted between its first position 162 and its second position 162' about pivot axis 152. It is generally preferred, but not required, that the hinge member 146 be fully articulating so that the user can lay both the backing member 120 and the aperture grille 112 flat against a surface during the layout mode (FIG. 5).

It is also preferable to have a second edge 154 of aperture grille 112 be releasably securable with a second edge 156 of backing member 120 when the aperture grille 112 is in its second position 162' (FIG. 6) to prevent the aperture grille 112 from separating from the backing member 120. A fastener 158 selected from any of a wide range of fastening systems or devices (e.g., screws, rivets, adhesives, formed tabs and hooks, brackets, etc.), suitable for the intended application, may be used to releasably secure the second edge 154 of aperture grille 112 to the second edge 156 of backing member 120.

The aperture grille 112 may comprise any of a wide range of materials (e.g., paper, cardboard, plastics, metals, or glass) that would be suitable for the intended application. By way of example only, the aperture grille 112 in one preferred embodiment may be fabricated from plastic.

The greeting card making apparatus 110 may be used as follows to create a greeting card with a flatbed scanner 111. Assuming that the user has selected the objects to be contained in the greeting card, the user moves the aperture grille 112 to its first position 162 (FIG. 5) and places each of the objects within the appropriate layout area 114. The user then moves the aperture grille 112 to its second position 162' (FIG. 6) and optionally engages the second edge 154 of aperture grille 112 with the second edge 156 of backing member 120. The user may then observe each of the portions of the objects exposed through the openings 118 to ensure a proper arrangement. If satisfied, the user positions the greeting card making apparatus 110 so that the aperture grille 112 is face-down on the scanning bed 119 of scanner 111, as illustrated in FIG. 6. The user next actuates the flatbed scanner 111 so that the flatbed scanner 111 scans both the aperture grille 112 and the portions of the objects exposed by the openings 118. The flatbed scanner 111 then sends image data signals that are representative of the arrangement of the objects within the layout areas to a host computer (not shown). Thereafter, the host computer may cause a printer (not shown) to reproduce a copy of the arrangement of the objects within the layout areas in the form of an unfolded greeting card (e.g., card 35). The unfolded greeting card may then be folded as necessary to create the final greeting card product.

In either of the two embodiments 10, 110 of the greeting card making apparatus, a sticker (not shown) may be provided for one or more of the objects. The sticker may removably adhere to the layout areas 14 or other areas on the greeting card making apparatus 10, 110 such that the sticker is reusable and repositionable. The sticker may be provided in a variety of themes (i.e., stars, rainbows, etc.) to help add creativity to the greeting card. By way of example only, the sticker may comprise a thought balloon upon which text can be added and erased. By using the thought balloon sticker, a user can easily and quickly add text to the greeting card.

It is contemplated that the inventive concepts herein described may be variously otherwise embodied and it is intended that the appended claims be construed to include alternative embodiments of the invention except insofar as limited by the prior art.

What is claimed is:

1. Greeting card making apparatus for assisting in the production of a greeting card by duplication apparatus comprising a layout template that defines a layout area, said layout area including a recessed area, said layout area accommodating at least one object that is to be contained in said greeting card, said greeting card making apparatus being convertible between a layout mode and a duplication mode, the layout area being observable by a user during the layout mode so that the user may observe an arrangement of the at least one object within said layout area, the layout template being reproducible by said duplication apparatus so that said duplication apparatus produces a copy of the arrangement of the at least one object within said layout area defined by said layout template.

2. The greeting card making apparatus of claim 1, wherein said layout template defines a position in said layout area for said at least one object and an orientation in said layout area for said at least one object.

3. The greeting card making apparatus of claim 1, wherein said layout area includes an opening.

4. The greeting card making apparatus of claim 1, further comprising a backing member, said backing member forming a portion of said layout area.

5. The greeting card making apparatus of claim 1, wherein said layout template defines at least one opening therein, said at least one opening exposing a portion of the at least one object contained within said layout area.

6. The greeting card making apparatus of claim 1, further comprising a transparent cover member operatively associated with said layout template so that said transparent cover member can be moved between a first position and a second position, said transparent cover member exposing said layout area when said transparent cover member is in the first position, said transparent cover member covering said layout area when said transparent cover member is in the second position, said transparent cover member also securing the at least one object contained within said layout area when said transparent cover member is in the second position.

7. The greeting card making apparatus of claim 1, further comprising a sticker, said sticker removably adhering to said greeting card making apparatus.

8. The greeting card making apparatus of claim 1, wherein said layout template comprises cardboard.

9. The greeting card making apparatus of claim 1, wherein said layout template comprises a plastic material.

10. The greeting card making apparatus of claim 1, wherein said layout area is defined by said layout template such that the arrangement of said at least one object within said layout area is to be contained in a front outer portion of said greeting card.

11. The greeting card making apparatus of claim 1, wherein said layout area is defined by said layout template such that the arrangement of said at least one object within said layout area is to be contained in a front inner portion of said greeting card.

12. The greeting card making apparatus of claim 1, wherein said layout area is defined by said layout template such that the arrangement of said at least one object within said layout area is to be contained in a back inner portion of said greeting card.

13. The greeting card making apparatus of claim 1, wherein said layout area is defined by said layout template such that the arrangement of said at least one object within said layout area is to be contained in a back outer portion of said greeting card.

14. Greeting card making apparatus for assisting in the production of a greeting card by duplication apparatus comprising:

a layout template that defines a layout area, said layout area accommodating at least one object that is to be contained in said greeting card, said greeting card making apparatus being convertible between a layout mode and a duplication mode, the layout area being observable by a user during the layout mode so that the user may observe an arrangement of the at least one object within said layout area, the layout template being reproducible by said duplication apparatus so that said duplication apparatus produces a copy of the arrangement of the at least one object within said layout area defined by said layout template;

a transparent cover member operatively associated with said layout template so that said transparent cover member can be moved between a first position and a second position, said transparent cover member exposing said layout area when said transparent cover member is in the first position, said transparent cover member covering said layout area when said transparent cover member is in the second position, said transparent cover member also securing the at least one object contained within said layout area when said transparent cover member is in the second position; and a backing member operatively associated with said layout template, and wherein said backing member and said transparent cover member secure the at least one object contained within said layout area when said transparent cover member is in the second position and said layout template is positioned between said backing member and said transparent cover member.

15. Greeting card making apparatus for assisting in the production of a greeting card by duplication apparatus, comprising:

a backing member that defines a layout area; said layout area accommodating at least one object that is to be contained in said greeting card; and an aperture grille operatively associated with said backing member so that said aperture grille can be moved between a first position and a second position, said aperture grille including at least one opening therein, said aperture grille exposing said layout area when said aperture grille is in the first position, said aperture grille covering a portion of said layout area when said aperture grille is in the second position, the at least one opening in said aperture grille exposing a portion of the at least one object contained within said layout area when said aperture grille is in the second position.

16. The greeting card making apparatus of claim 15, wherein said aperture grille secures the at least one object contained within said layout area when said aperture grille is in the second position.

17. Greeting card making apparatus, comprising:

a layout template defining at least one opening therein, said at least one opening defining at least one layout area, said at least one layout area accommodating at least one object that is to be contained in said greeting card; and a cover member pivotally mounted to said layout template so that said cover member can be pivoted between a first position and a second position, said cover member exposing said at least one layout area when said cover member is in the first position, said cover member securing the at least one object in said at least one layout area when said cover member is in the second position, said cover member comprising a rigid, transparent material.

18. The greeting card making apparatus of claim 17, wherein said cover member defines at least one opening therein, said at least one opening in said cover member being generally aligned with at least a portion of the at least one object in said at least one layout area when said cover member is in the second position.

19. The greeting card making apparatus of claim 17, further comprising a backing member attached to said layout template.

20. The greeting card making apparatus of claim 19, wherein said backing member is opaque.

21. The greeting card making apparatus of claim 19, wherein said backing member is rigid.

22. The greeting card making apparatus of claim 17, further comprising a guideline provided on said layout template, said guideline defining said at least one layout area.

* * * * *